March 20, 1928.
J. A. FRITSCH
WORK TABLE
Filed Dec. 26, 1925
1,663,248
3 Sheets-Sheet 2
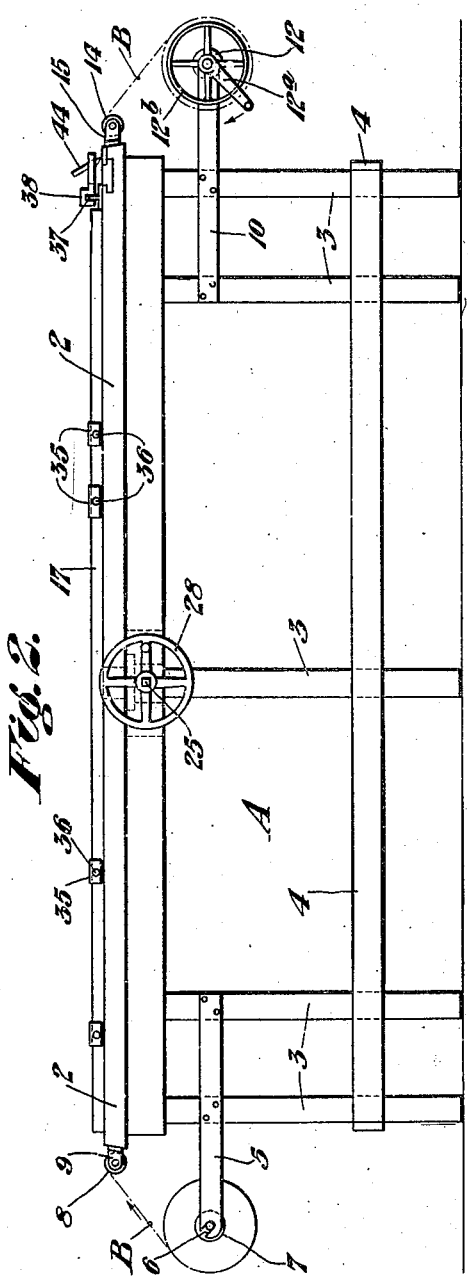
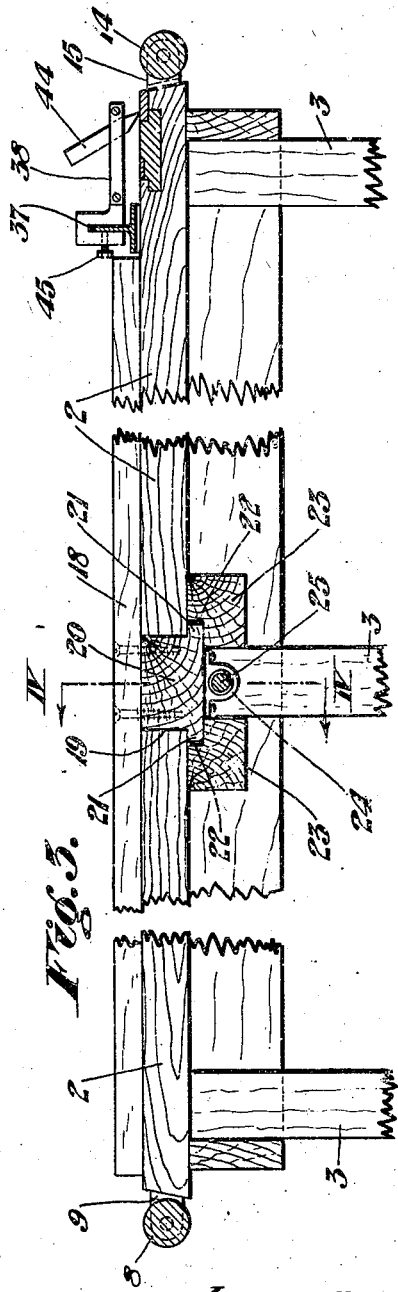
Witnesses:
Edwin Trueb
Inventor:
JOHN A. FRITSCH,
by: John E. Jackson.
his Attorney.

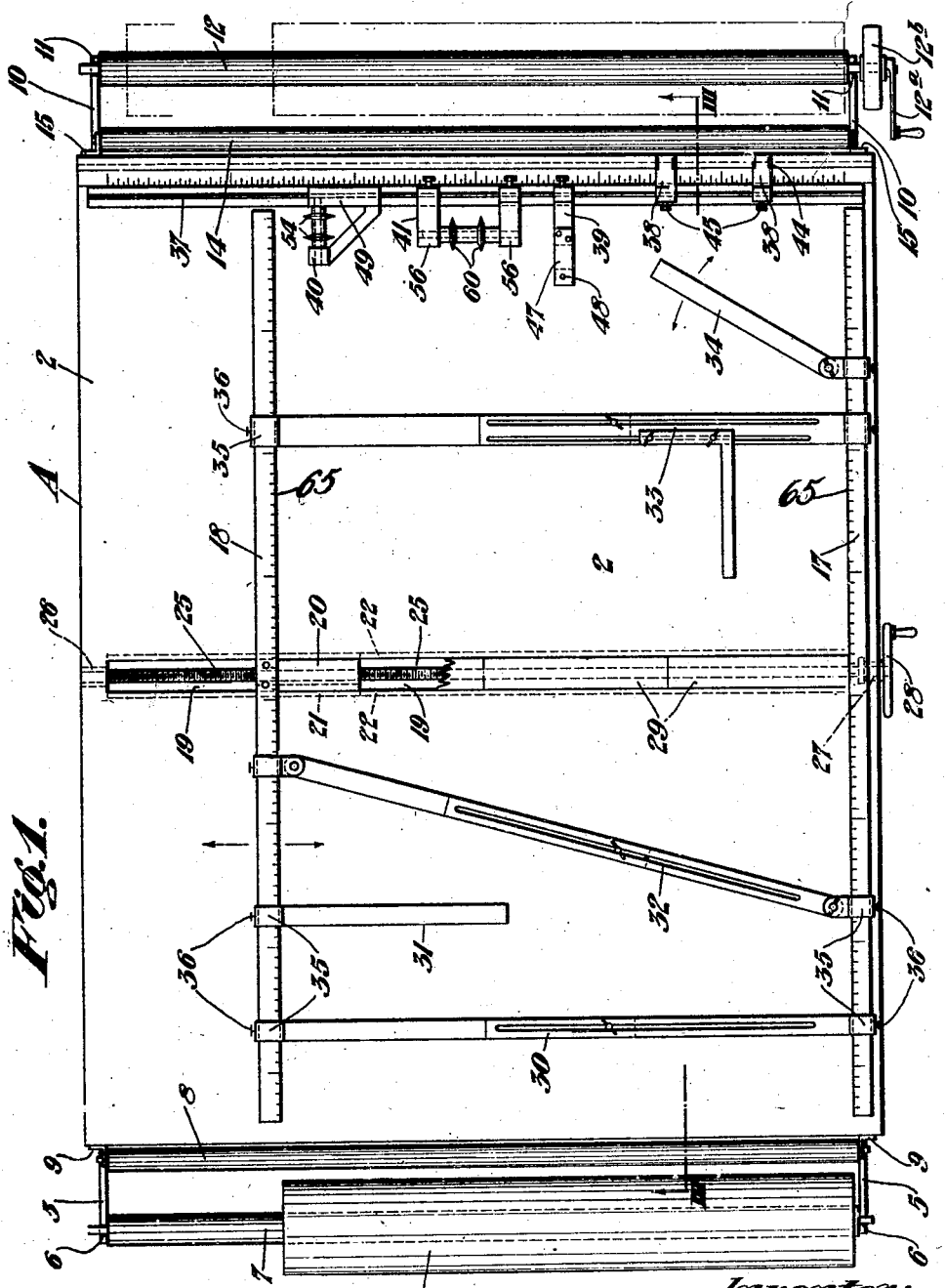

March 20, 1928.
J. A. FRITSCH
1,663,248
WORK TABLE
Filed Dec. 26, 1925
3 Sheets-Sheet 3
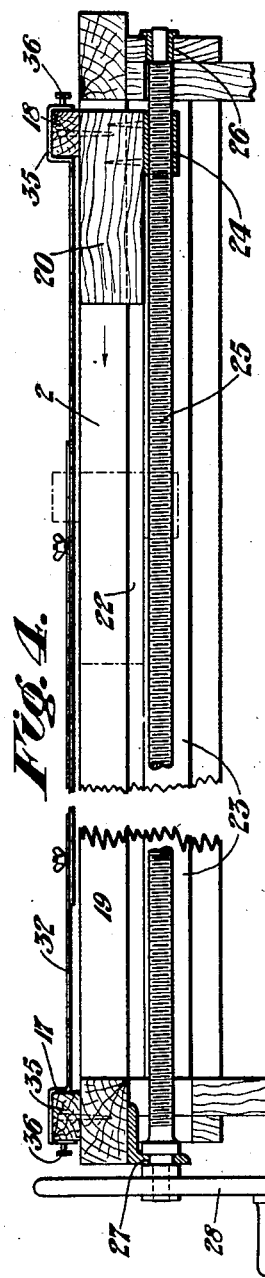
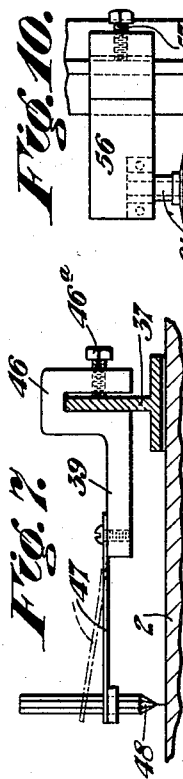
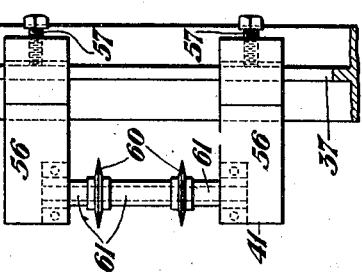
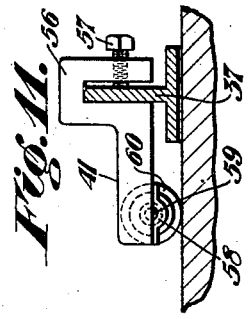
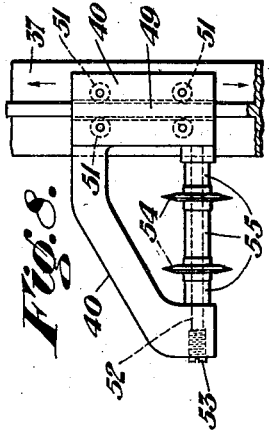
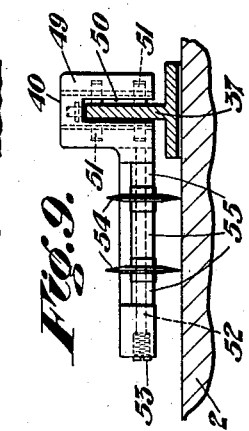
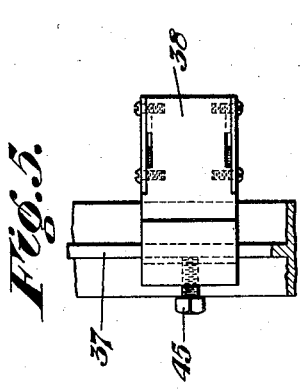
Witnesses:
Edwin Trueb
Inventor:
JOHN A. FRITSCH,
by John E. Jackson,
his Attorney.

Patented Mar. 20, 1928.

1,663,248

UNITED STATES PATENT OFFICE.

JOHN A. FRITSCH, OF PITTSBURGH, PENNSYLVANIA.

WORKTABLE.

Application filed December 26, 1925. Serial No. 77,685.

This invention relates to work tables and more particularly to a combined lay-out and cutting table for use in upholstering and other shops in which cloth and other flexible material is worked upon in quantity.

In upholstering shops for instance it is often necessary to lay-out a considerable number of articles of duplicate design and considerable time is consumed by expert workmen in laying out or marking these articles.

The present invention provides means whereby suitable lay-out bars may be adjusted over the material on the table and locked in position and when the one article is laid out the material will be rolled up on a receiving roll thereby moving a new length of material under the lay-out bars. After the second article is laid out the receiving roll is again rotated to take up that length of material, and the operation may thus be continued until all the articles desired are laid out. A further advantage of this table is that after the lay-out bars are once set in the desired position any unskilled labor may be used to mark the material.

It is also aften necessary to cut long narrow strips of material from wide material and this also necessitates considerable labor, while the present table provides for a plurality of adjustable cutters which may be set at any desired point across the width of the table and said cutters will automatically and continuously cut the material so it is wound on the receiving roll.

Another object of the invention is to provide means adjustable transversely of the table for automatically forming continuous marks lengthwise of the material during the movement of the material along the table.

A further object is to provide a table with adjustable lay-out mechanism for working on various widths of material.

A still further object is to provide a table having the novel design, construction and combination of parts hereinafter described and illustrated in the accompanying drawings.

In the drawings:

Figure 1 is a plan view of a table embodying this invention.

Figure 2 is a side elevation thereof.

Figure 3 is a sectional elevation on the line III—III of Figure 1.

Figure 4 is a transverse sectional elevation on the line IV—IV of Figure 3.

Figures 5 and 6 are a detail plan and side elevation showing the cutting tool holders and cutters.

Figure 7 is a detail elevation of one of the pencil marking tools.

Figures 8 and 9 are a detail plan and side elevation of a marking tool.

Figures 10 and 11 are a detail plan and side elevation of another form of marking tool.

Referring more particularly to the drawings the letter A designates the table as a whole which comprises a top 2 and legs 3, which legs are secured together by tie strips 4.

Brackets 5 having bearing slots 6 are secured to the table legs 3 at the rear end and form a support for a material supply and feed roller 7 which is removably journaled in said slots 6.

An antifriction roller 8 is journaled in suitable brackets 9 secured to the rear end edge of the table top 2.

A second pair of brackets 10 are secured to the table legs 3 at the forward end of the table and are provided with slots 11 in their upper faces to provide bearings for the material receiving roll 12 which is provided with a hand operating crank 12ª and a pulley 12ᵇ which is for power operation if desired.

An anti-friction roller 14 is journaled in suitable brackets 15 secured to the forward end edge of the table top 2.

A straight edge 17 extends substantially the entire length of the table in close proximity with the side edge of the table. The straight edge 17 is bolted or otherwise rigidly secured in place.

A second straight edge 18 is slidably mounted on top of the table intermediate the sides thereof. The top face of the table is slotted transversely at 19 to provide a path for a guide block 20 secured to the lower side of the straight edge 18, which block is provided with flanges 21 adapted to fit in guideways 22 formed in guide strips 23 secured to the bottom side of the table top 2. The block 20 is provided with a nut 24 which is threaded on a screw shaft 25 journaled at 26 and 27 and provided with a hand wheel 28 for operating the same. If desired of course suitable speed up gearing may be interposed between the hand wheel and shaft.

It will be seen from the above that the straight edge 18 may be readily moved transversely of the table by revolving the shaft 25 by its hand wheel 28.

Suitable filler blocks 29 are removably mounted in the slot 19 in the table top 2 so as to provide a continuous working top, said blocks being adapted to be removed when the straight edge 18 is adjusted.

A variety of lay-out bars 30, 31, 32, 33, and 34 are provided. These lay-out bars are provided U-shaped clamping ends 35 adapted to fit over the straight edges and are adapted to extend transversely of the table at various angles. The clamping ends 35 of the bars are each provided with a set screw 36 adapted to lock the bars in adjusted position.

A track member 37 extends transversely of and is secured to the table adjacent the forward or receiving roll end and is elevated above the table top 2 so as to permit the material being worked upon which is designated by the letter B to pass thereunder.

A plurality of tool holders 38, 39, 40 and 42 are adapted to be mounted on the track 37.

The tool holders 38 are shown in detail in Figures 5 and 6 and are adapted to have knives 44 removably secured therein and to be adjusted to various positions on the track and locked in position by set screws 45.

The tool holder 39, of which there may be any number, is composed of a track engaging portion 46 and a spring or resilient tongue portion 47 having a tool receiving aperture adapted to contain a pencil or other marker 48 which engages and marks the material B as it passes thereunder. The tool holders 39 are adjustable along the track 37 and are adapted to be locked in position by set screws 46ª.

The tool holder 40, shown in detail in Figures 8 and 9 is a transverse marking tool and is adapted to ride along the track 37. The tool holder 40 is composed of a body portion 49, which is grooved at 50 to fit over the track 37 and is provided with anti-friction rollers 51 in the groove 50. A shaft 52 is removably journaled in the body portion 49 and is held in position by a set screw 53. A plurality of marker rollers or disks 54 are mounted on the shaft 52 and held in spaced relation by sleeve members 55. The spacing of the disks 54 may be varied by substituting sleeves 55 of varying lengths.

The tool holder 42 comprises a pair of spaced track engaging members 56 provided with set screws 57 for locking them in place on the track, upon which they are adjustably mounted. Each of the members 56 is provided with a bearing 58 to receive a shaft 59 which carries marking disks 60 held in spaced relation by sleeve members 61. The spacing of these marking rollers or disks 60 may also be varied by substituting spacing sleeves 61 of varying lengths.

In operation a roll of material B is first mounted on the feed roller 7 and the material is drawn along the table, inserted under the track 37 and secured by tacking, or otherwise, to the receiving roller 12.

The straight edge 18 is then adjusted to the width of the material and the several lay-out bars are positioned as desired for laying out the work piece and locked in position by the set screws 36. If any of the tool holders 38, 39, or 41 are desired they are also adjusted along the track 37 and locked in position.

A pencil or other marker may then be run along the lay-out bars to mark the material B and after their positions have been marked the receiving roll 12 will be rotated to take up the marked material and bring an unmarked section of material onto the table top 2 in position for marking. As the material is being wound up on the receiving roll 12 the tools of the tool holders 38, 39, and 41 will automatically mark or cut the material.

If the tool holder 40 is to be used to mark transverse lines on the material the other tool holders are removed from the track 37 and the holder 40 is moved manually along the track 37 when desired to mark the material B.

From the above it will be readily seen that various combinations of layouts may be formed from the lay-out bars and various tools provided.

Suitable measuring indicia 65 are provided on the straight-edges and also on the table top 2 between the track 37 and forward end of the table. The measuring indicia are adapted to facilitate the setting up of the various lay-out bars and tools.

While I have shown and described one specific embodiment of my invention it will be understood that I do not wish to be limited thereto since various modifications may be made without departing from the scope of my invention as defined in the appended claims.

What I claim is:

1. A work table for laying out and otherwise working on cloth and other flexible material, comprising an elongated table portion, a fixed straight edge adjacent one side edge of said table, a second straight edge adjustably mounted between the side edges of said table, screw means for adjusting said adjustable straight edge transversely of said table and a plurality of layout bars adjustably mounted on said straight edges and extending transversely of said table, at least some of said layout bars being connected to both said stationary and said adjustable straight edges, and said last named layout bars being extensible.

2. A work table for laying out and otherwise working on cloth and other flexible material, comprising an elongated table portion, a fixed straight edge adjacent one side edge of said table, a second straight edge adjustably mounted between the side edges of said table, said table being provided with a transversely extending guide slot intermediate its ends, a guide block secured to the lower face of said adjustable straight edge and extending into said slot, a nut in said block, bearings secured adjacent each side edge of said table, a screw shaft journaled in said bearings and having a threaded engagement with said nut, and means for rotating said shaft to cause a transverse movement of said adjustable straight edge relative to said table.

3. A work table for laying out and otherwise working on cloth and other flexible material, comprising an elongated table portion, a fixed straight edge adjacent one side edge of said table, a second straight edge adjustably mounted between the side edges of said table, screw means for adjusting said adjustable straight edge transversely of said table and a plurality of layout bars adjustably and removably mounted on said straight edges, at least one of said layout bars being extensible and being provided with a pivot joint adjacent each end so as to permit said bar to be arranged transversely between said straight edges at an angle to the transverse axis of said table.

4. A work table for laying out and otherwise working on cloth and other flexible material, comprising an elongated table portion, a fixed straight edge adjacent one side edge of said table, said table having a transversely extending slot intermediate the ends of its top, grooved guide strips secured to the bottom face of the table top and paralleling the sides of said slot, a second straight edge adjustably mounted between the side edges of said table, a guide block secured to the lower face of said adjustable straight edge and extending into said slot, flanges on said guide block and extending into the grooves in said guide strips, a nut in said block, bearings secured to said table adjacent each of its side edges, a screw shaft journaled in said bearings and having a threaded engagement with said nut, and means for rotating said shaft to cause a transverse movement of said adjustable straight edge relative to said table.

5. A work table for laying out and otherwise working on cloth and other flexible material, comprising in combination, an elongated rigid table portion, a material supporting and feed roll at one end and below the upper edge of said table, a material receiving roll at the other end and below the upper edge of said table, anti-friction rollers along each of the end edges of said table, the material to be operated upon being adapted to be first drawn across said table by hand from said feed roll and secured to said receiving roll, means for rotating said receiving roll to move said material across said table, an inverted T-shaped track member fixedly mounted on and extending transversely of said table adjacent the receiving roll end, said track member being elevated above said table to permit the material being worked upon to pass thereunder, and a plurality of tool holders mounted on said track and adapted to contain tools for marking and cutting the material being worked upon, at least some of said tool holders being adapted to be removably locked in position on said track.

In testimony whereof I affix my signature.

JOHN A. FRITSCH.